US012155336B2

(12) United States Patent
Burgermeister

(10) Patent No.: US 12,155,336 B2
(45) Date of Patent: Nov. 26, 2024

(54) CIRCUIT AND METHOD FOR CONTROLLING AN ELECTROMECHANICAL HOLDING BRAKE, FREQUENCY CONVERTER AND SYSTEM

(71) Applicant: Lenze Swiss AG, Romanshorn (CH)

(72) Inventor: Andreas Burgermeister, Mauren (CH)

(73) Assignee: Lenze Swiss AG, Romanshorn (CH)

( * ) Notice: Subject to any disclaimer, the term of this patent is extended or adjusted under 35 U.S.C. 154(b) by 121 days.

(21) Appl. No.: 17/912,562

(22) PCT Filed: Jan. 20, 2021

(86) PCT No.: PCT/EP2021/051198
§ 371 (c)(1),
(2) Date: Sep. 19, 2022

(87) PCT Pub. No.: WO2021/185491
PCT Pub. Date: Sep. 23, 2021

(65) Prior Publication Data
US 2023/0238899 A1    Jul. 27, 2023

(30) Foreign Application Priority Data

Mar. 20, 2020 (DE) ............ 10 2020 203 623.3

(51) Int. Cl.
*H02P 3/04* (2006.01)
*H02M 3/158* (2006.01)
*H02M 7/06* (2006.01)

(52) U.S. Cl.
CPC ............. *H02P 3/04* (2013.01); *H02M 3/158* (2013.01); *H02M 7/06* (2013.01)

(58) Field of Classification Search
CPC ........... H02P 3/04; H02M 3/158; H02M 7/06; H02M 1/0009; H02M 1/007; H02M 5/44
USPC .................................................. 318/362, 375
See application file for complete search history.

(56) References Cited

U.S. PATENT DOCUMENTS

| 6,094,023 | A  | * | 7/2000  | Ericsson ............... H02P 3/06 318/368 |
| 6,803,737 | B2 | * | 10/2004 | Scheidegger .......... G05B 19/21 318/567 |
| 8,466,640 | B2 | * | 6/2013  | Hertz ..................... H02P 3/20 318/362 |

FOREIGN PATENT DOCUMENTS

| DE | 10 2007 026 212 A1 | 12/2008 |
| DE | 10 2007 040 423 A1 | 2/2009 |
| DE | 10 2008 053 679 B3 | 1/2010 |
| DE | 10 2017 220 109 A1 | 5/2019 |
| JP | 2011-195287 A      | 10/2011 |

OTHER PUBLICATIONS

International Search Report (PCT/ISA/210) issued in PCT Application No. PCT/EP2021/051198 dated Apr. 7, 2021 with English translation (five (5) pages).

(Continued)

*Primary Examiner* — David Luo
(74) *Attorney, Agent, or Firm* — Crowell & Moring LLP

(57) ABSTRACT

A circuit for controlling an electromechanical holding brake, includes: at least one halfwave rectifier, which generates a pulsed DC voltage from a mains AC voltage, and a phase gating circuit which is designed to generate a control signal for the electromechanical holding brake from the pulsed DC voltage by means of the phase gating.

10 Claims, 3 Drawing Sheets

(56) References Cited

OTHER PUBLICATIONS

German-language Written Opinion (PCT/ISA/237) issued in PCT Application No. PCT/EP2021/051198 dated Apr. 7, 2021 (three (3) pages).
German-language Office Action issued in German Application No. 10 2020 203 623.3 dated Dec. 16, 2020 (seven (7) pages).

* cited by examiner

CIRCUIT AND METHOD FOR CONTROLLING AN ELECTROMECHANICAL HOLDING BRAKE, FREQUENCY CONVERTER AND SYSTEM

BACKGROUND AND SUMMARY

The invention relates to a circuit and to a method for controlling an electromechanical holding brake, to a frequency converter and to an electric drive system.

The invention is based on the object of providing a circuit and a method for controlling an electromechanical holding brake, a frequency converter and an electric drive system which are able to be used as flexibly as possible.

The circuit according to the invention is used to control an electromechanical holding brake or spring-applied brake, such as those typically used for stopping an output shaft of an electric motor. In this respect, reference is also made to the relevant technical literature.

The circuit has at least one, in particular uncontrolled, half-wave rectifier which produces a pulsed DC voltage from a mains AC voltage or from a phase voltage of the mains AC voltage. The half-wave rectifier, also referred to as single-branch circuit, rectifies only one half-cycle of the mains AC voltage, the other not being used, with the result that the pulsed DC voltage is produced. In this respect, reference is also made to the relevant technical literature.

The circuit further has a phase-gating circuit which is designed to generate a control signal, for example in the form of a control voltage and/or a control current, for the electromechanical holding brake or the control coil thereof from the pulsed DC voltage by means of phase gating. With regard to the fundamental functions and circuits for phase gating control, reference is likewise made to the relevant technical literature.

According to one embodiment, the circuit further has a holding-brake connection having a first connection pole and a second connection pole, and a capacitor which is looped in between the first connection pole and the second connection pole. A control coil of the electromechanical holding brake is intended to be connected to the holding-brake connection, the electromechanical holding brake being released and allowing rotation only when the control coil has been sufficiently energized.

According to one embodiment, the circuit further has a first switching element and a second switching element, wherein the first switching element, the capacitor and the second switching element are looped in in series between an output of the at least one half-wave rectifier and a negative intermediate-circuit potential.

According to one embodiment, the circuit further has a first diode which is looped in in the reverse direction between the first connection pole and the negative intermediate-circuit potential, and a second diode which is looped in in the forward direction between the second connection pole and a positive intermediate-circuit potential.

According to one embodiment, the circuit further has a control unit which is designed to control the first switching element and the second switching element in such a way that the control signal for the electromechanical holding brake corresponds to a control signal intended for the electromechanical holding brake, for example a rated voltage value of the holding brake, regardless of an amplitude or an RMS value of the mains AC voltage.

According to one embodiment, the control signal is a control voltage, wherein the control unit is designed to control the first switching element and the second switching element in such a way that the control voltage for the electromechanical holding brake has a predefined average level over time corresponding, for example, to a rated voltage of the electromechanical holding brake, regardless of an amplitude of the mains AC voltage. The level or the rated voltage can be 180 V for example.

According to one embodiment, the control unit is designed to close the first switching element as soon as the pulsed DC voltage falls below a predefined threshold level.

According to one embodiment, the control unit is designed to close the first switching element as soon as the pulsed DC voltage has its minimum value.

The frequency converter according to the invention is used to control an electric motor and an electromechanical holding brake, which is conventionally used to stop an output shaft of the electric motor.

The frequency converter has a circuit as described above.

The frequency converter further has a conventional (DC voltage) intermediate circuit. The intermediate circuit conventionally has a first intermediate-circuit conductor on which the positive intermediate-circuit potential is present, and a second intermediate-circuit conductor on which the negative intermediate-circuit potential is present. A difference between the positive intermediate-circuit potential and the negative intermediate-circuit potential corresponds to an intermediate-circuit voltage. The intermediate-circuit conductors can be connected to intermediate-circuit connections of the frequency converter which are used to connect the frequency converter to an intermediate-circuit system. The intermediate-circuit conductors can additionally or alternatively be connected to a single-phase or polyphase rectifier of the frequency converter which produces the intermediate-circuit voltage from a mains AC voltage by rectification. In this respect, reference is also made to the relevant technical literature. The mains AC voltage of the frequency converter can correspond to the mains AC voltage of the circuit for controlling the electromechanical holding brake.

The frequency convener further has an inverter which is designed to produce control voltages for the electric motor from a difference between the positive intermediate-circuit potential and the negative intermediate-circuit potential, i.e. the intermediate-circuit voltage. In this respect, reference is likewise made to the relevant technical literature.

The electric drive system has a frequency converter as described above, an electromechanical holding brake and an electric motor.

The method according to the invention is used to control an electromechanical holding brake and has the following steps: producing a pulsed DC voltage by way of half-wave rectification of a mains AC voltage, and generating a control signal for the electromechanical holding brake by means of phase gating control of the pulsed DC voltage.

According to one embodiment, the control signal, in particular in the form of a control voltage, is changed or reduced after a predefined switched-on duration in such a way that a current to the electromechanical holding brake decreases.

The invention is described in detail below with reference to the drawings.

DETAILED DESCRIPTION OF THE DRAWINGS

Figure 1:
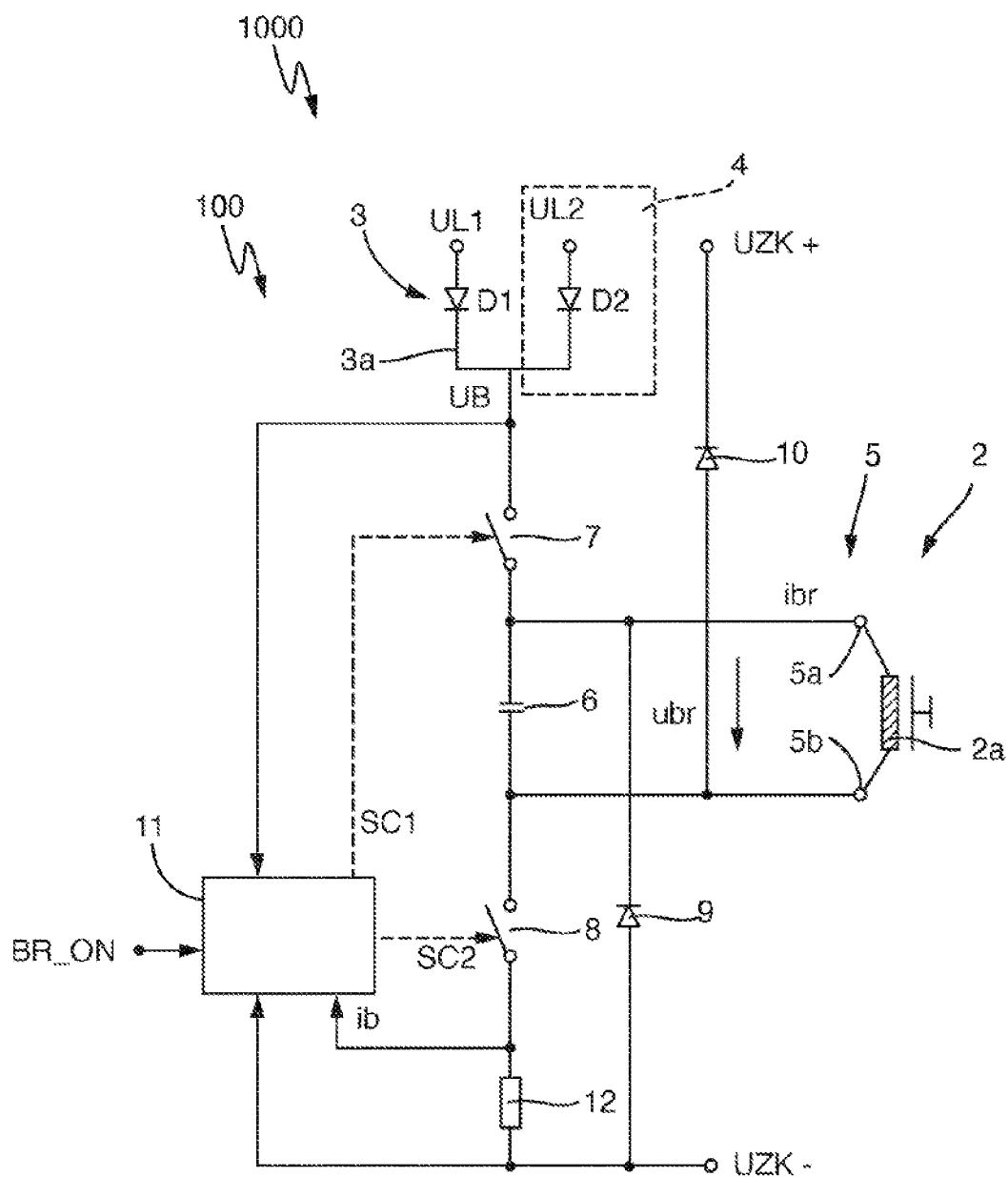
FIG. 1 shows a circuit according to an embodiment of the invention for controlling an electromechanical holding brake.

FIG. 1 shows a circuit 1000 for controlling a conventional electromechanical holding brake 2.

The circuit 1000 has a half-wave rectifier in the form of a rectifier diode 3, wherein the half-wave rectifier or the rectifier diode 3 produces a pulsed DC voltage UB from a mains AC voltage or from an associated mains phase UL1. The circuit can optionally have a further half-wave rectifier 4 in the form of a further rectifier diode, wherein the half-wave rectifier or the rectifier diode 4 produces the pulsed DC voltage UB from a further mains AC voltage or from an associated mains phase UL2 in conjunction with the rectifier diode 3.

Figure 2:
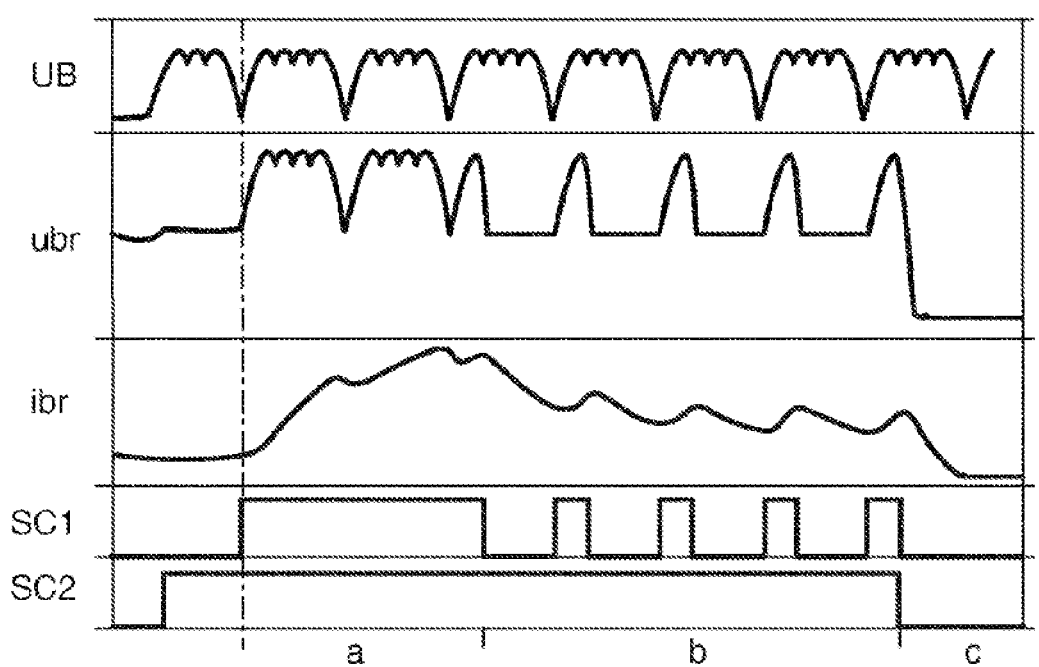
FIG. 2 shows signal waveforms over time for the circuit shown in FIG. 1.

The circuit 1000 further has a phase-gating circuit 100 which is designed to generate a control signal in the form of a control voltage ubr or a control current ibr for the electromechanical holding brake 2 or the control coil 2a thereof from the pulsed DC voltage UB by means of phase gating, see FIG. 2.

The circuit 1000 has a holding-brake connection 5 having a first connection pole 5a and a second connection pole 5b to which corresponding connection poles of the electromechanical holding brake 2 or the control coil 2a thereof need to be connected or are connected.

The circuit 1000 has a capacitor 6 which is looped in between the first connection pole 5a and the second connection pole 5b.

The circuit 1000 further has a shunt resistor 12 for current measurement.

The circuit 1000 further has a first switching element 7 and a second switching element 8, each in the form of switching transistors, for example, wherein the first switching element 7, the capacitor 6, the second switching element 8 and the shunt resistor 12 are looped in in series between an output 3a of the half-wave rectifier 3, 4 and a negative intermediate-circuit potential UZK−.

The circuit 1000 further has a first diode 9 and a second diode 10. The anode of the first diode 9 is connected to the negative intermediate-circuit potential UZK+ and the cathode of the first diode 9 is connected to the first connection pole 5a. The anode of the second diode 10 is connected to the second connection pole 5b and the cathode of the second diode 10 is connected to a positive intermediate-circuit potential UZK+.

The circuit 1000 further has a control unit 11, for example in the form of a microcontroller, which is designed to control the first switching element 7 and the second switching element 8 in such a way that the control signal ubr or ibr for the electromechanical holding brake 2 corresponds to a control signal intended for the electromechanical holding brake 2 regardless of an amplitude or an RMS value of the mains AC voltage UL1 and/or UL2. In particular, the control unit 11 is designed to control the first switching element 7 and the second switching element 8 in such a way that a level of the control voltage ubr corresponds to a rated voltage, for example 180 V, for the electromechanical holding brake 2 regardless of an amplitude or an RMS value of the mains AC voltage UL1 and/or UL2.

Figure 3:
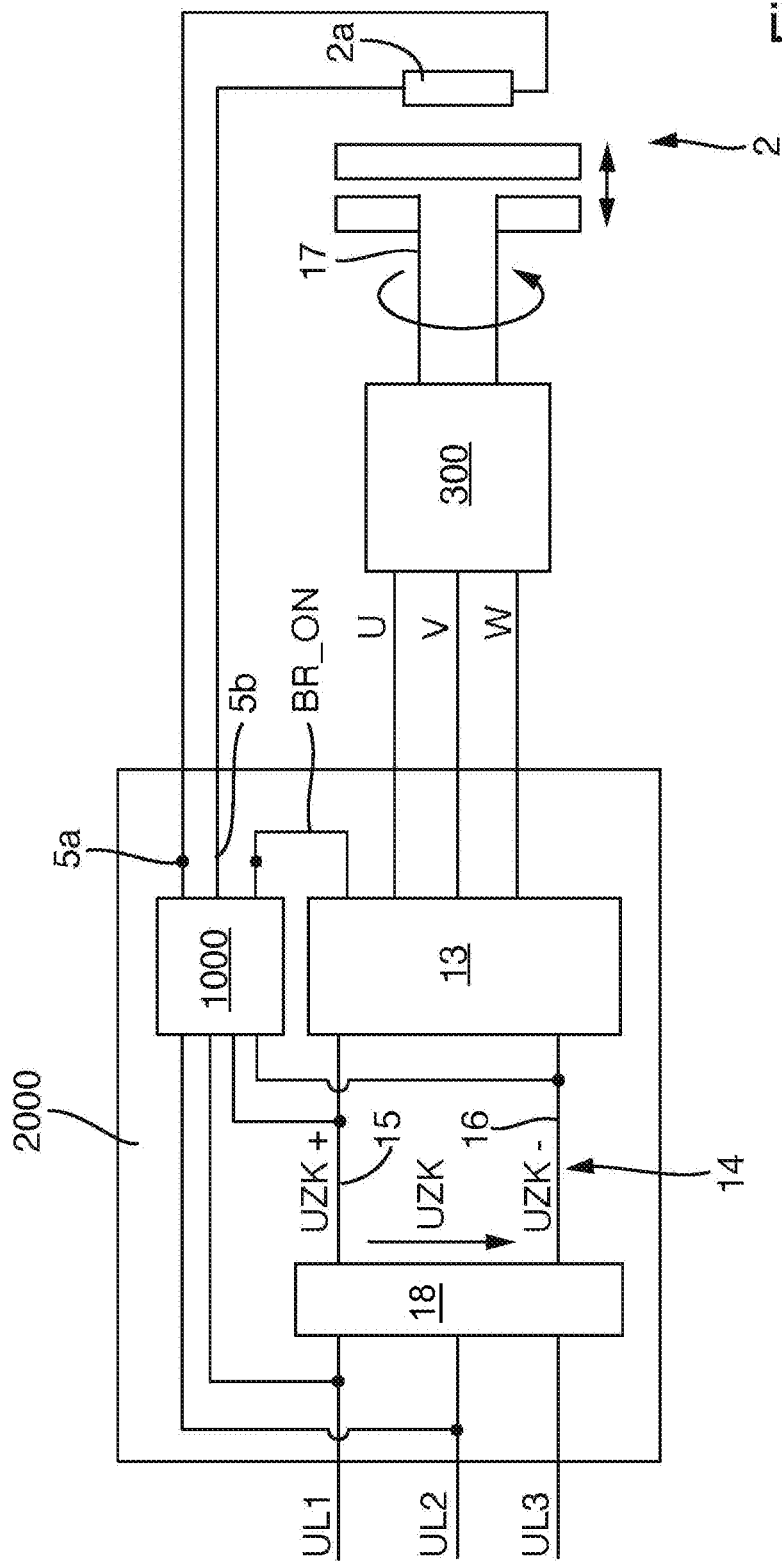
FIG. 3 shows an electric drive system having a frequency converter according to the invention, an electric motor and an electromechanical holding brake.

FIG. 3 shows an electric drive system having a frequency converter 2000, an electric motor 300 having an output shaft 17 and the electromechanical holding brake 2. The holding brake 2 is conventionally used to stop the output shaft 17 of the electric motor 300.

The frequency converter 2000 is used to control the electric motor 300 and the electromechanical holding brake 2.

The frequency converter 2000 has the circuit 1000 from FIG. 1.

The frequency converter 2000 further has an intermediate circuit 14 having a first intermediate-circuit conductor 15 on which the positive intermediate-circuit potential UZK+ is present, and a second intermediate-circuit conductor 16 on which the negative intermediate-circuit potential UZK− is present. An intermediate-circuit voltage UZK corresponds to the difference between the positive intermediate-circuit potential UZK+ and the negative intermediate-circuit potential UZK−.

The frequency converter 2000 further has a conventional inverter 13 which is designed to produce control voltages U, V, W for the electric motor 300 from the intermediate-circuit voltage UZK.

The frequency converter 2000 further has a three-phase rectifier 18 which produces the intermediate-circuit voltage UZK from the mains voltages or mains phases UL1, UL2 and UL3.

FIG. 2 shows signal waveforms over time for the circuit shown in FIG. 1. Here, UB is the pulsed DC voltage (referenced to the negative intermediate-circuit potential), ubr is the voltage between the connection poles 5a and 5b, ibr is the current to the control coil 2a of the electromechanical holding brake 2, SC1 is a control signal for the first switching element 7 and SC2 is a control signal for the second switching element 8.

The control unit 11 has the DC voltage UB applied to it, and therefore knows the level thereof, and has a voltage which is dropped across the shunt resistor 12 applied to it, which in certain switching cycles corresponds to the current ibr. Based on these voltages, the control unit 11 generates the control signals SC1 and SC2.

In a period of time a) which lasts 300 ms, for example, both switching elements 7 and 8 are closed or put into an on-state in order to increase the control current ibr, with the result that the electromechanical holding brake 2 ultimately lifts and enables rotation of the motor 300 or rotation of the output shaft 17. This starting can be initiated, for example, by selecting a suitable state of a signal BR_ON generated by means of the frequency converter 2000.

In a period of time b), phase gating takes place, during which the control current ibr is reduced to and then held at a value which gives rise to a magnetic field, generated by means of the control coil 2a, which is still sufficient for reliably lifting the electromechanical holding brake 2.

In a period of time c), both switching elements 7 and 8 are opened in order to cause the electromechanical holding brake 2 to be rapidly switched off, i.e. the electromechanical holding brake 2 engages with minimum delay and then prevents rotation of the motor shaft 17.

According to the invention, the brake voltage ubr can be adjusted within certain limits regardless of an amplitude or an RMS value of the mains voltage UL1 or UL2 (or UL3).

The circuit 1000 is conventionally supplied with power from one or two mains voltages or mains phases UL1 and UL2. The reference ground potential of the circuit is UZK.

The first switching element 7 is used to adjust the control voltage ubr for the electromechanical holding brake 2 by means of phase gating. The second switching element 8 makes it possible to rapidly switch off or demagnetize the electromechanical holding brake 2 via the two diodes 9 and 10. The stored energy is fed back to the intermediate circuit 14 in this case.

The effect of the capacitor 6 is that the gated-out sinusoidal voltage does not have a steep switching edge. The capacitor 6 accepts the current as soon as the switching element 7 switches off. In this instance, the capacitor 6 is discharged to about −0.7 V.

As soon as the voltage UB has reached the lowest point (about 0 V), the switching element 7 switches on again and increases the brake voltage ubr again. The brake current ibr can be measured across the shunt resistor 12, this being able to be used primarily to diagnose a break in a cable, a brake short-circuit, a faulty brake, etc.

The electromechanical holding brake 2 installed in an electric motor is no longer dependent on the mains voltage UL1 or UL2 by virtue of the circuit 1000 according to the invention. A 180-V standard brake can be used, for example, for a 230 V/AC to 480 V/AC mains system. Three different designs are conventionally required here.

Furthermore, a reduction in power loss by lowering the current is possible by, for example, reducing a level of the control voltage ubr after a predefined switched-on duration, for example 300 ms. This allows higher energy efficiency and prevents the brake from being burnt through at low rotation speeds (poor motor cooling).

Further, a short-circuit strength of the brake connections 5a, 5b amongst each other and with respect to a reference ground potential, for example ground potential, is possible, since the two switching elements 7 and 8 cannot have their polarity reversed in the event of a short circuit. A converter is thus no longer destroyed when the brake has a ground fault.

By virtue of the edge-slowing capacitor 6, the sinusoidal half-cycle can now be gated in and any desired brake voltage ubr can thus be generated.

The invention claimed is:

1. A circuit for controlling an electromechanical holding brake, comprising:
   at least one half-wave rectifier which produces a pulsed DC voltage from a mains AC voltage;
   a phase-gating circuit which is designed to generate a control signal for the electromechanical holding brake from the pulsed DC voltage by way of phase gating;
   further comprising:
     a holding-brake connection having a first connection pole and a second connection pole; and
     a capacitor which is looped in between the first connection pole and the second connection pole.

2. The circuit according to claim 1, further comprising:
   a first switching element; and
   a second switching element,
   wherein the first switching element, the capacitor and the second switching element are looped in in series between an output of the at least one half-wave rectifier and a negative intermediate-circuit potential.

3. The circuit according to claim 2, further comprising:
   a first diode which is looped in in a reverse direction between the first connection pole and the negative intermediate-circuit potential; and
   a second diode which is looped in in a forward direction between the second connection pole and a positive intermediate-circuit potential.

4. The circuit according to claim 2, further comprising:
   a control unit which is designed to control the first switching element and the second switching element in such a way that the control signal for the electromechanical holding brake corresponds to a control signal intended for the electromechanical holding brake regardless of an amplitude of the mains AC voltage.

5. The circuit according to claim 4, wherein
   the control signal is a control voltage, wherein the control unit is designed to control the first switching element and the second switching element in such a way that the control voltage for the electromechanical holding brake has a predefined average level over time regardless of an amplitude of the mains AC voltage.

6. The circuit according to claim 4, wherein
   the control unit is designed to close the first switching element as soon as the pulsed DC voltage falls below a predefined threshold level.

7. The circuit according to claim 4, wherein
   the control unit is designed to close the first switching element as soon as the pulsed DC voltage has its minimum value.

8. A frequency converter for controlling an electric motor and an electromechanical holding brake, comprising:
   a circuit for controlling the electromechanical holding brake, comprising:
     at least one half-wave rectifier which produces a pulsed DC voltage from a mains AC voltage; and
     a phase-gating circuit which is designed to generate a control signal for the electromechanical holding brake from the pulsed DC voltage by way of phase gating;
   an intermediate circuit having a first intermediate-circuit conductor on which a positive intermediate-circuit potential is present, and a second intermediate-circuit conductor on which a negative intermediate-circuit potential is present; and
   an inverter which is designed to produce control voltages for the electric motor from a difference between the positive intermediate-circuit potential and the negative intermediate-circuit potential.

9. An electric drive system, comprising:
   the frequency converter according to claim 8;
   the electromechanical holding brake; and
   the electric motor.

10. A method for controlling an electromechanical holding brake, the method comprising the steps of:
    producing a pulsed DC voltage by way of half-wave rectification of a mains AC voltage; and
    generating a control signal for the electromechanical holding brake by way of phase gating of the pulsed DC voltage,
    wherein
    the control signal is changed after a predefined switched-on duration in such a way that a current to the electromechanical holding brake decreases.

* * * * *